3,839,543
CATALYST FOR THE PRODUCTION OF CYANOGEN CHLORIDE
Friedhelm Geiger, Grossauheim, and Wolfgang Weigert, Offenbach, Germany, assignors to Deutsche Gold- und Silber-Scheideanstalt vormals Roessler, Frankfurt, Germany
No Drawing. Filed Oct. 31, 1972, Ser. No. 302,419
Claims priority, application Germany, Nov. 4, 1971, P 21 54 721.7
Int. Cl. B01j *11/06;* C01b *21/18, 31/08*
U.S. Cl. 423—379                    7 Claims

ABSTRACT OF THE DISCLOSURE

Carbon containing the graphite structure is employed as a catalyst for the gas phase reaction of chlorine and hydrogen cyanide to form cyanogen chloride. There can be mixed with the catalyst inert materials such as porcelain, qlartz or metallic nickel.

---

The present invention relates to a catalyst for the reaction of chlorine with hydrogen cyanide in the gas phase to form cyanogen chloride.

It is known to produce cyanogen chloride by the action of chlorine on hydrogen cyanide in the gaseous phase in the presence of animal charcoal (Chemical Abstracts Vol. 15, page 2593 (1921)). This type of catalyst, however, has only slight selectivity; there are formed byproducts such as cyanogen and cyanuric chloride in considerable amounts. Additionally the catalyst only has a short lifetime. Therefore it is unsuited for the production of cyanogen chloride on an industrial scale.

There has now been found a carbon containing catalyst for the reaction of chlorine with hydrogen cyanide to form cyanogen chloride in the gas phase which is characterized by the carbon present in the form of the graphite structure. This type of catalyst surprisingly is extremely selective. It makes it possible to recover cyanogen chloride in very high yields while byproducts are formed in only insignificant amounts. The catalyst has an excellent lifetime. Its outstanding properties are also retained in operating for weeks at a time.

As catalyst there can be used carbon with a graphite structure from any source. There can be employed commercial graphite of natural source or synthetically produced graphite. The carbon can be used in various forms, for example, in the form of briquettes or in granular form. The form and particle size depend in a given case on the design of the reactor. In addition, in a solid bed reactor it is generally suitable to select a particle size of between about 2 and 12 mm. It should be noted, however, that particle size is not a critical feature of the invention.

The carbon can be employed as such or it can be added in admixture with inert materials such as, for example, porcelain or quartz. The inert materials can be added to the carbon before the shaping or can be added afterwards in the corresponding form to the carbon. There can also be added metallic nickel as the inert material, for example, in the form of chips or packing. Other suitable inert fillers include silica or tantalum.

There can advantageously be admixed about 20 to 60% of the inert material with the carbon. Generally much larger amounts especially above 80% of inert material are unsuitable.

The reaction of hydrogen cyanide with chlorine takes place using the catalyst of the invention in the gas phase at temperatures between 200 and 600° C., preferably at temperatures between 350 and 520° C. Temperatures below 200° C. can be employed, but at such temperatures the reaction speed is noticeably slower. Operation is generally carried out at atmospheric pressure. Higher and lower pressures, however, can also be used.

The hydrogen cyanide and chlorine are suitably employed in about equimolar proportions. However, advantageously the chlorine is present in an excess of up to about 10 mol percent, especially about 1 to 5 mol percent. The gaseous mixture of hydrogen cyanide and chlorine can be diluted with inert gases, as for example carbon dioxide, nitrogen, argon or helium, cyanogen chloride or hydrogen chloride.

The recovery of cyanogen chloride from the reaction mixture nad its separation from the hydrogen chloride necessarily formed in equimolar amounts can be carried out in known manner, for example, by absorption of the cyanogen chloride in an organic solvent according to the process of Geiger Patent 3,618,295. The entire disclosure of the Geiger patent is hereby incorporated by reference. The cyanogen chloride can be employed for customary purposes. For example, it serves as the starting material for the production of guanidine derivative such as N,N'-diphenyl guanidine.

Cyanuric chloride can also be produced from the cyanogen chloride. For this purpose the cyanogen chloride can be led over activated carbon at elevated temperature according to the process of German Patent 842,067 for example. Under the conditions of the process of the invention cyanuric chloride can be recovered directly in considerable amount, if the catalyst of graphite structure provided as the catalyst is partially or entirely replaced by activated carbon or if the catalyst of carbon with graphite structure is connected with one of activated carbon, in a given case in a special reactor.

Unless otherwise indicated, all parts and percentages are by weight.

Example 1

As reactor there was used a pure nickel tube having a clear width of 40 mm. and a length of 2000 mm., in which there was concentrically arranged a pure nickel tube having a diameter of 12 mm. and a length of 2000 mm. In the inner tube there was a thermocouple. The catalyst was filled in the space between the inner tube and the outer tube. The outer tube was surrounded by a salt melt.

As catalyst there was employed natural graphite having a particle size of 3 to 5 mm. There were introduced hourly 2.2 kg. of chlorine and 0.8 kg. of hydrogen cyanide. The salt melt was held at a temperature of 450 to 480° C. The temperature in the inner tube of the reactor adjusted itself to 490 to 520° C. The gas mixture recovered consisted of 60.5% cyanogen chloride, 36.1% hydrogen chloride, 3.3% chlorine and 0.10% cyanogen. Cyanuric chloride was not detectable. The cyanogen chloride was separated from the gaseous mixture by absorption in 1,2,4-trichlorobenzene (as described in the Geiger patent) and recovered by distillation from this solvent. The hourly yield of cyanogen chloride was 1795 to 1805 grams, corresponding to 98.6 to 99.2% based on the hydrogen cyanide added. The catalyst exhibited unchanged activity after 16 weeks of operation.

Example 2

There was employed the same reactor as in Example 1. However, it was filled with a catalyst which consisted of a mixture of equal parts by volume of graphite (particle size 3 to 5 mm.) and quartz glass waste (particle size 3 to 7 mm.). There were introduced into the reactor hourly 1.24 kg. of chlorine and 0.45 kg. of hydrogen cyanide. The salt melt was held at 480 to 485° C. The temperature in the inner reactor adjusted itself to 500° C. There was recovered a gaseous mixture that consisted of 60.3% cyanogen chloride, 36.0% hydrogen chloride, 3.6% chlorine and 0.10% cyanogen. Cyanuric chloride was not detected. There were recovered hourly from the mixture by the process of Example 1 1010 to 1015 grams of cyanogen chloride, corresponding to a yield of 98.6 to 99.1% based on the hydrogen cyanide added.

Example 3

There was used a similar reactor to that in Example 1, however, the clear width was 45 mm. As catalyst there was used a synthetic graphite having a particle size of 6 to 10 mm. There were led into the reactor hourly 2.7 kg. of chlorine and 1.0 kg. hydrogen cyanide. The salt melt was held at 450 to 470° C. The temperature in the inner reactor regulated itself to 530° C. There was recovered a gaseous mixture which consisted of 61.1% cyanogen chloride, 36.4% hydrogen chloride, 2.3% chlorine and 0.13% cyanogen. Cyanuric chloride was not detectable. Using the process of Example 1 there were recovered hourly from the gaseous mixture 2250 grams of cyanogen chloride, corresponding to a yield of 98.8% based on the hydrogen cyanide added.

What is claimed is:

1. In a process of preparing cyanogen chloride by reacting hydrogen cyanide with chlorine in the gaseous phase at 200 to 600° C. in the presence of a carbon containing catalyst the improvement comprising employing as the catalyst carbon having the graphite structure.

2. The process according to claim 1 wherein chlorine is employed in a molar excess of 1 to 10% of hydrogen cyanide.

3. The process according to claim 1 wherein the catalyst is natural graphite.

4. The process according to claim 1 wherein the catalyst is synthetic graphite.

5. The process according to claim 1 wherein an inert solid material is employed with the catalyst in an amount of up to 80% of the total of catalyst and inert material.

6. The process according to claim 5 wherein the inert material is porcelain, quartz or nickel metal and the inert material is employed in an amount of 20 to 60%.

7. The process of claim 1 wherein the catalyst consists of graphite.

References Cited

UNITED STATES PATENTS

| 3,666,427 | 5/1972 | Enders | 423—379 |
| 2,481,824 | 9/1949 | Claussen et al. | 252—445 |
| 3,066,099 | 11/1962 | Mohun | 252—445 |

FOREIGN PATENTS

| 990,341 | 4/1965 | Great Britain | 423—383 |

OTHER REFERENCES

Sernagiotto: "Preparation of Cyanogen Chloride," Chemical Abstracts, Vol. 15 (1921), p. 2593.

HOKE S. MILLER, Primary Examiner

U.S. Cl. X.R.

252—444, 446, 447; 423—486